United States Patent
Jain et al.

(10) Patent No.: US 11,481,151 B2
(45) Date of Patent: Oct. 25, 2022

(54) PAYLOAD SPILL BOUNDARY TABLE ASSISTED READ IN SOLID STATE DRIVES

(71) Applicant: Kioxia Corporation, Minato (JP)

(72) Inventors: Amit Jain, Cupertino, CA (US); Gyan Prakash, San Jose, CA (US); Ashwini Puttaswamy, Cupertino, CA (US)

(73) Assignee: Kioxia Corporation, Tokyo (JP)

( * ) Notice: Subject to any disclaimer, the term of this patent is extended or adjusted under 35 U.S.C. 154(b) by 154 days.

(21) Appl. No.: 16/932,038

(22) Filed: Jul. 17, 2020

(65) Prior Publication Data

US 2022/0019377 A1    Jan. 20, 2022

(51) Int. Cl.
| | |
|---|---|
| *G11C 29/00* | (2006.01) |
| *G06F 3/06* | (2006.01) |
| *G06F 11/10* | (2006.01) |
| *G06F 12/10* | (2016.01) |

(52) U.S. Cl.
CPC .......... *G06F 3/0659* (2013.01); *G06F 3/0604* (2013.01); *G06F 3/0679* (2013.01); *G06F 11/1068* (2013.01); *G06F 12/10* (2013.01)

(58) Field of Classification Search
CPC .... G06F 3/0604; G06F 3/0659; G06F 3/0679; G06F 11/076; G06F 11/0763; G06F 11/1068; G06F 11/3037; G06F 12/10; G06F 12/0882; G11C 11/4085; G11C 16/10
USPC ....... 714/763, 764, 767, 769, 772, 773, 779; 365/185.09, 185.33
See application file for complete search history.

(56) References Cited

U.S. PATENT DOCUMENTS

| | | | | |
|---|---|---|---|---|
| 2011/0258514 A1* | 10/2011 | Lasser | ............... | H03M 13/2927 714/763 |
| 2013/0031301 A1* | 1/2013 | Barndt | .................. | G06F 3/0679 711/E12.008 |
| 2013/0246891 A1* | 9/2013 | Manning | ............... | G06F 3/0688 714/752 |
| 2015/0074336 A1* | 3/2015 | Nemoto | ................ | G06F 3/0679 711/103 |
| 2017/0269991 A1* | 9/2017 | Bazarsky | ................ | G06F 3/064 |
| 2018/0067666 A1* | 3/2018 | d'Abreu | ............. | G06F 11/1044 |
| 2018/0374548 A1* | 12/2018 | Achtenberg | ........ | G06F 11/1072 |

* cited by examiner

*Primary Examiner* — Albert Decady
*Assistant Examiner* — Enamul M Kabir
(74) *Attorney, Agent, or Firm* — Allen & Overy LLP

(57) ABSTRACT

A method performed by a controller of a solid state drive comprising receiving from a host a read request for read data stored in nonvolatile semiconductor storage devices of the solid state drive. The method also comprises identifying a first codeword and a second codeword, the first codeword and the second codeword comprising the read data corresponding to the read request. Responsive to the read request, the method comprises reading a first portion of the read data contained in the first codeword and reading a second portion of the read data contained in the second codeword, assembling the first portion and the second portion as assembled read data, and transferring the assembled read data to the host responsive to the read request. The first and second codewords are adjacently stored, and the assembled read data has a length that is greater than the length of the first and second codewords.

21 Claims, 8 Drawing Sheets

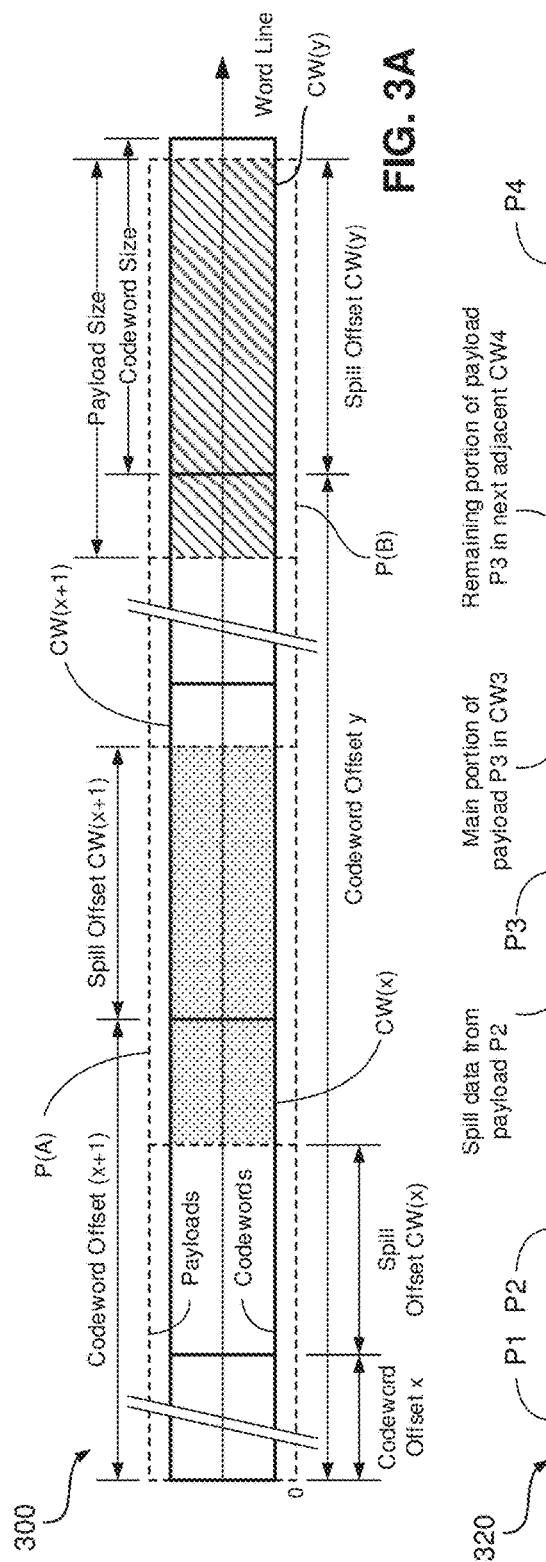
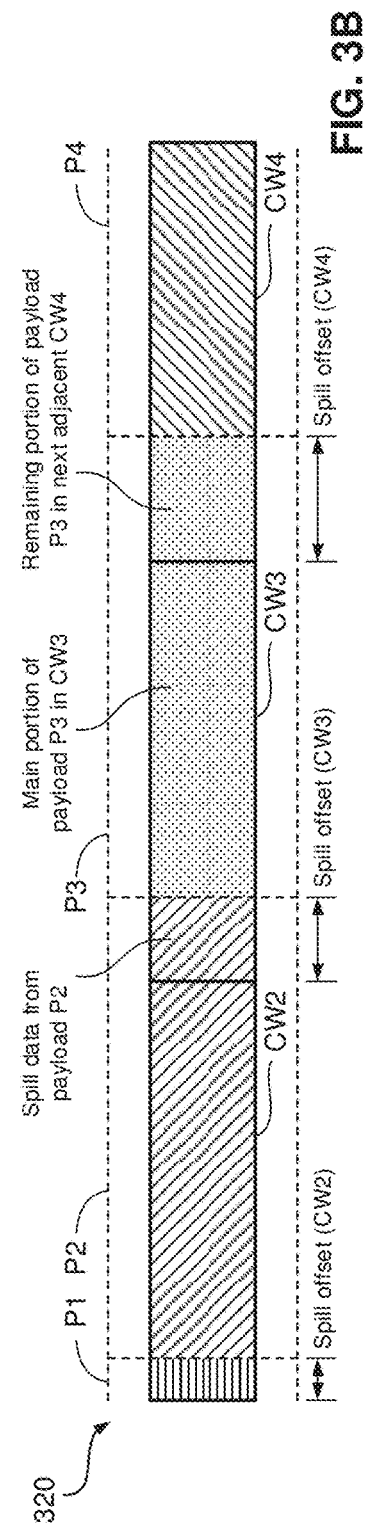
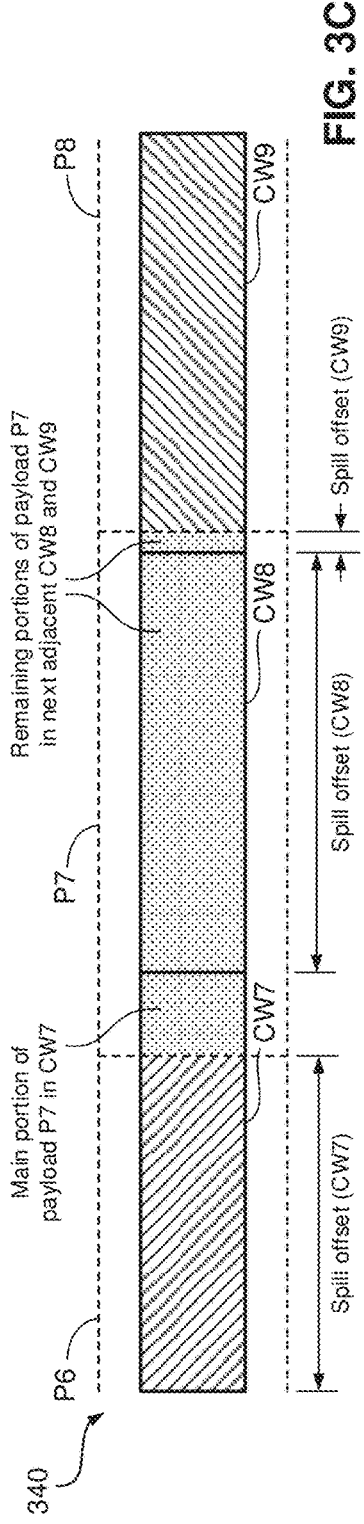
FIG. 3A
FIG. 3B
FIG. 3C

PAYLOAD SPILL BOUNDARY TABLE ASSISTED READ IN SOLID STATE DRIVES

FIELD

The present disclosure relates to solid-state drives and methods that provides a common infrastructure that dynamically adjusts to changes in code rate of the solid-state drive to enable efficient transfer of data when processing a read request from a host.

BACKGROUND

A solid-state drive (SSD) generally has faster performance, is more compact, and is less sensitive to vibration or physical shock than a conventional magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

SSDs utilize physical memory cells that comprise nonvolatile semiconductor storage devices, such as NAND devices, to store data. A controller is used in an SSD to manage the transfer of data between a host and the memory cells of the SSD. Writing data to and reading data from the physical memory cells of SSDs typically involves shuffling data between various memory cells.

Until now the size of the memory pages (e.g. NAND pages) in memory cells of an SSD have been configured such that they were able to accommodate multiple data payloads per data unit of the memory page, and the error correction code (ECC) bits would lie in a reserved spare area of the memory page which was available principally to handle error correction. However, this has drastically changed as there is an increasing trend in current memory technology to squeeze more data bits per memory cell of the memory. At the same time, the bit error rate (BER) on such data pages within the memory increases as the memory ages, necessitating increasing number of ECC bits which may exceed the space available in the reserved area of the memory page.

In order to maintain good throughput and latency on the workload without decreasing the efficiency of the memory by performing elaborate error correction, a larger number of error correction code (ECC) bits are built into each data unit. Increasing the amount of ECC bits per data unit takes away from the physical space that could be used to store the payload data from a host. While the physical space in the memory for the payload data from the host decreases over time, the size of the payload itself does not change. For example, in a 16 kilobyte (KB) NAND memory page, the increase in the BER means that there would be a larger portion of the 16 KB NAND memory page that would be dedicated to the ECC for the data stored in the page which would be in addition to any bits dedicated to ECC in the reserved or safe area of the page. This takes away from the physical NAND memory space for the payload data, which was supposed to be 16 KB, but is now considerably less due to the larger size of the ECC required. It therefore follows that each data payload would spill across more than one data unit in the memory. This imposes a challenges on how to manage the stored data during data transfers, such as during a read or write requests from a host.

SUMMARY

According to an embodiment of the present disclosure there is provided a method performed by a controller of a solid state drive. The method comprises receiving from a host a read request for read data stored in one or more of a plurality of nonvolatile semiconductor storage devices of the solid state drive. The method also comprises identifying a first codeword and a second codeword from a plurality of codewords stored in the one or more of the plurality of nonvolatile storage devices, the first codeword and the second codeword comprising the read data corresponding to the read request. Responsive to the read request, the method comprises reading a first portion of the read data contained in the first codeword and reading a second portion of the read data contained in the second codeword. Further the method comprises assembling the first portion and the second portion as assembled read data, and transferring the assembled read data to the host responsive to the read request. Here the second codeword is adjacent to the first codeword as stored in the one or more of the plurality of nonvolatile storage devices, and the assembled read data has a data length that is greater than a first data length of the first codeword or a second data length of the second codeword.

In some implementations, the read data includes a logical cluster address (LCA). In certain implementations, the method further comprises converting the LCA of the read data into a media cluster address (MCA) in the nonvolatile semiconductor storage devices at which the read data is stored. In further implementations, the method also comprises determining a codeword offset corresponding to the MCA, the codeword offset identifying the first codeword in the plurality of codewords in which the read data begins. In other implementations, the method further comprises identifying a spill offset associated with the first codeword offset, the spill offset identifying a position within the first codeword at which the read data begins. In some implementations, the method further comprises reading the first portion of the read data from the spill offset of the first codeword to the end of the first codeword.

In certain implementations, the method further comprises calculating the second portion of the read data to be read. In further implementations, the method comprises responsive to the second portion of the read data being non-zero, identifying a spill offset of the second codeword, and reading the second portion of the read data from start of the second codeword to the spill offset of the second codeword. In other implementations, the method comprises determining if the second portion of the read data has spilled over to a next adjacent codeword. In some implementations, the method comprises, responsive to the second portion of the read data spilling over to the next adjacent codeword, identifying a spill offset of the next adjacent codeword, and reading the spilled second portion of the read data from start of the next adjacent codeword to the spill offset of the next adjacent codeword. In certain implementations, the method further comprises indexing into an address look-up table which maps the LCA to the MCA in the nonvolatile semiconductor storage device at which the read data is stored.

In further implementations, the method also comprises indexing into a codeword look-up table which maps the MCA to the codeword offset for the nonvolatile semiconductor storage devices at which the read data is stored. In other implementations, the method comprises indexing into a payload spill boundary look-up table which maps a codeword in the nonvolatile semiconductor storages devices to a spill offset. In some implementations, the first data length and the second data length are equal, and the method further comprises determining a data spill per codeword by subtracting the first data length from a data length of the read data, determining a total spill in the nonvolatile semiconductor storage device for each codeword offset by multiplying the spill per codeword by the codeword offset, and determining the spill offset by dividing the total spill by the first data length.

In other implementations, the plurality of codewords are stored on one or more wordlines in the nonvolatile semiconductor storage devices. In some implementations, each of the wordlines have a different code rate. In certain implementations, the controller generates a payload spill boundary look-up table for each code rate. In certain implementations, the read data extends over multiple wordlines, and the method further comprises determining the wordline associated with each codeword, and selecting a payload spill boundary look-up table based on the associated wordline. In further implementations, the method further comprises storing a code rate of the nonvolatile semiconductor storages device in a configuration file in a read-only memory within the controller.

In some implementations, the method further comprises determining a bit error rate associated with each of the plurality of nonvolatile semiconductor storage devices, adjusting the code rate of at least one of the nonvolatile semiconductor storage devices based on the bit error rate, and updating the code rate in the configuration file. In certain implementations, assembling the read data comprises combining the first and second portions of the read data with a header, error correction code (ECC) and parity check code prior to transferring the read data to the host. In further implementations, each of the plurality of the nonvolatile semiconductor storage devices comprises a NAND memory.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which:

FIG. 3A illustrates general features in the storage of data payloads in codewords of a nonvolatile semiconductor storage device, according to one or more embodiments of the present disclosure;

FIGS. 3B-3C illustrate a specific examples of the storage of data payloads in codewords of a nonvolatile semiconductor storage device, according to one or more embodiments of the present disclosure;

DETAILED DESCRIPTION

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD architectures with memories having smaller data frames due to higher BER.

Figure 1:
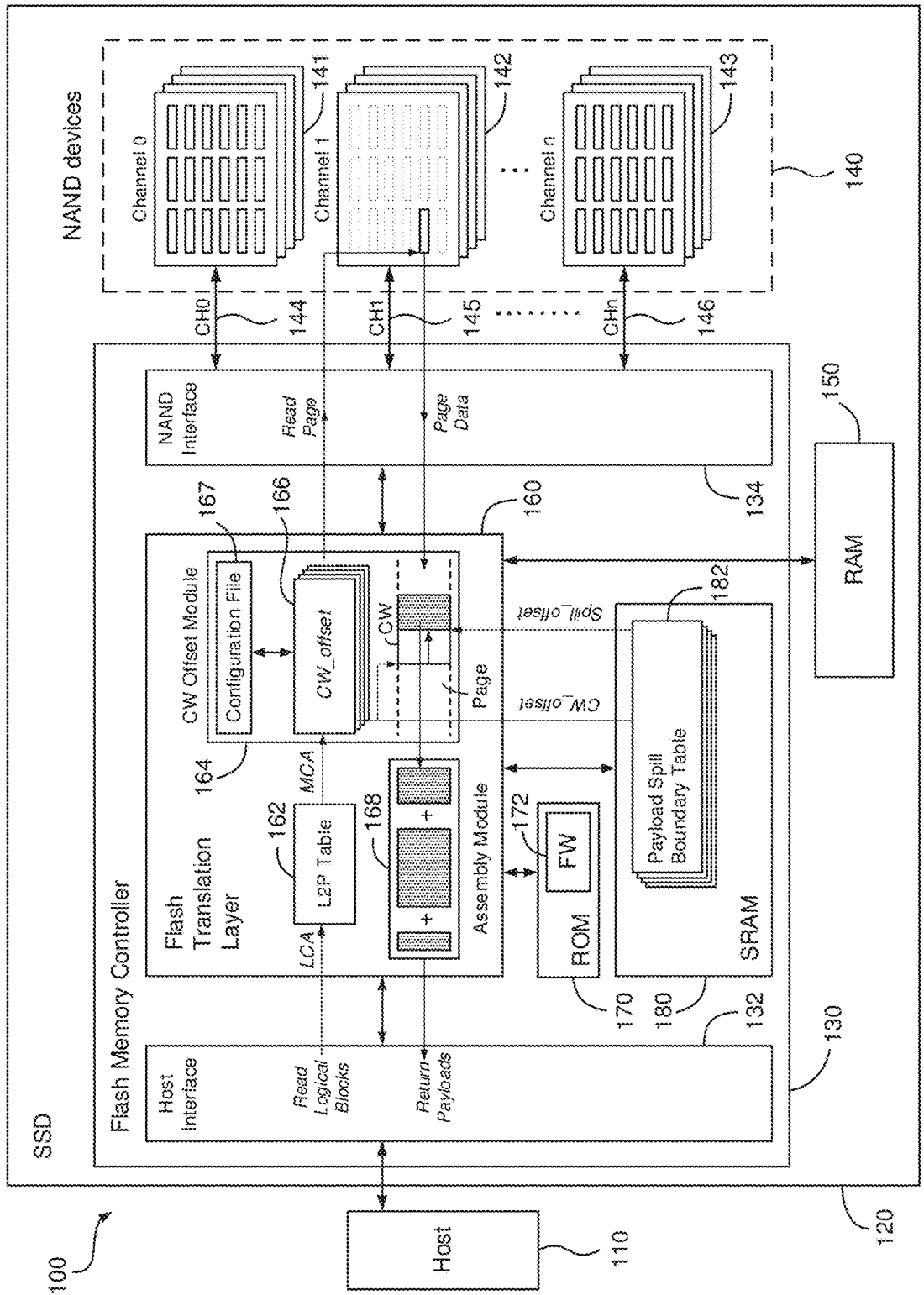
FIG. 1 shows a schematic representation of a solid-state drive (SSD), configured according to one or more embodiments of the present disclosure.

FIG. 1 is a block diagram of a computing system 100 comprising at least one host 110 in communication with a storage device 120. The host 110 is a computing system that comprises processors, memory, and other components as is generally known in the art, and which is not shown in FIG. 1 for the sake of brevity. Storage device 120 provides nonvolatile storage functionality for use by the host 110. Storage device 120 is an SSD, which is a nonvolatile storage device that typically includes an integrated circuit comprising a controller 130. The controller 130 is communicatively coupled to nonvolatile semiconductor-based storage elements 140 as the storage medium. Such semiconductor-based storage elements 140 may comprise NAND-based flash memory devices 141-143, for example. SSD 120 also includes a memory external to the controller 130, such as a random access memory (RAM) 150. In some implementations, the RAM 150 may comprise a dynamic RAM (DRAM). DRAM 150 comprises several buffers used to buffer data during read and write operations between the host 110 and the storage elements 140.

The storage elements 140 may comprise a plurality of NAND chips or semiconductor dies, such as, for example, 32, 64, 128, 256 separate NAND chips or dies. Each NAND chip or die may comprise a plurality of blocks, each of which comprises a plurality of pages. Each page stores payload data from the host 110 in codewords, each codeword containing the original payload data from the host together with error correcting code bits. Further each page may be divided into sub-pages when the memory cells of the NAND die store more than one bit per cell, for example a lower page, middle page and upper page when TLC (Triple Level Cell) memory cells are used to store three data bits per cell. The storage elements 140 are composed of memory cells which are connected together into strings of cells, containing 16, 32, 64 or more cells, with each string connected to a bit line. Large numbers of these strings of cells form a memory block, with a wordline connecting corresponding cells in each string. Such a structure of the storage elements 140 facilitates the forming of a memory page for data transfer, with one or more memory pages in each wordline. This sequence pf memory pages determines the minimum quantity of data which may be transferred to and from the storage elements 140 in write (program) and read operations.

The controller 130 comprises a host interface 132 which enables communication with the host 110 for the receipt of read and write requests, for example. Controller 130 also includes an interface 134 for communication with the storage elements 140. Interface 134 may communicate with the storage elements 140 via a plurality of channels, such as channels CH0, CH1, ..., CHn, as shown in FIG. 1. Controller 130 may also comprise a RAM interface (not shown) for communication with the RAM 150 external to the controller 130. Host interface 132 in controller 130 may comprise a Serial Advanced Technology Attachment (SATA) connector or a PCIe™ ("Peripheral Component Interface Express") connector using a NVMe™ protocol (NVMe™ is an acronym for "NVM express," where "NVM" stands for "nonvolatile memory"), for example. Interface 134 may comprise an Open NAND Flash Interface (ONFI) or a manufacturer's proprietary interface, for example. The interface that communicates with the external RAM may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

As shown in FIG. 1, the controller 130 may comprise a flash translation layer 160 that enables the controller 130 to perform various functions that facilitate the processing of read and write requests from the host 110. The controller 130 may also include a read-only memory (ROM) 170 which stores instructions for management of the controller functions, such as the allocation of payload data to the storage elements 140, as will be detailed in the following description. ROM 170 stores such instructions in the form of firmware 172, which is programmable. This allows the operation of the memory controller 130 to be updated periodically throughout the lifespan of the SSD 120. The firmware 172 takes into consideration the change of characteristics (such as BER) of the storage elements 140 during their lifespan so as to optimize performance of the SSD 120. Such characteristics include the BER of the NAND devices which then determines the code rate (the ratio between the information data bits and the total number of bits, including ECC bits, in a codeword), the length of the ECC and parity codes (e.g. cyclic redundancy check (CRC) parity codes), the data frame size and the codeword size of the NAND devices 141-143 that make up the storage elements 140. The characteristics, such as the BER, of the NAND devices may change over time, temperature or number of Program/Erase (P/E) cycles and so the firmware 172 enables the controller 130 to tailor its operation in accordance with the age, temperature or number of P/E cycles of the NAND devices 141-143. The controller 130 may also store metadata in the NAND devices 141-143, some of which may be vital metadata which requires much better data protection than ordinary metadata (which may still require better protection than payload data from the host 110). Therefore the firmware 172 enables the controller 130 to tailor its operation in accordance with the type of data, payload data and metadata, as well as the age, temperature or number of P/E cycles of NAND devices 141-143.

The flash translation layer 160 may comprise a look-up table 162 that maps a logical address of the payload data received from the host 110 to a physical address within any of the NAND devices 141-143. In certain embodiments, the logical address may comprise a logical cluster address (LCA), and the physical address may comprise a media cluster address (MCA). Thus look-up table 162 maps the LCA of a payload to an MCA in the storage element 140. The flash translation layer 160 may also comprise a codeword offset module 164. The codeword offset module 164 is a code-dependent construct that is created by the firmware 172 on bootup of the SSD 120 to manage the payload stored in codewords in the NAND devices 141-143. Based on the characteristics of the NAND devices 141-143, such as the code rate, the firmware 172 performs calculations to determine the offset within each codeword at which the start of payload data is stored. In some embodiments, the firmware 172 creates a codeword offset look-up table 166 based on the code rate of the memory pages of each wordline in the NAND devices 141-143. In some embodiments, the code rate of each wordline, or each memory page in a wordline, in the NAND devices 141-143 may be stored in a configuration file 167. The flash translation layer 160 may also comprise an assembly module 168. The assembly module 168 is a code-dependent construct that is created by the firmware 172 that assembles the data transferred from the storage elements 140 to the host 110. Here the assembly module 168 assembles the payload prior to transferring the payload to the host 110 when the SSD processes a read request from the host 110.

Additionally, the controller 130 may include a local memory 180, such as a static random access memory (SRAM), that is internal to the memory controller 130. As with the DRAM 150, the SRAM 180 may also comprises several buffers that may be utilized by the flash translation layer 160 of the controller 130 during operation. According to embodiments of the present disclosure, the SRAM 180 may store a look-up table 182, such as a payload spill boundary table, that enables the controller 130 to manage the allocation of data to and from the codewords stored in the NAND devices 141-143. In some embodiments, the payload spill boundary table informs the controller 130 of the position within each codeword at which the payload data begins.

Figure 2:
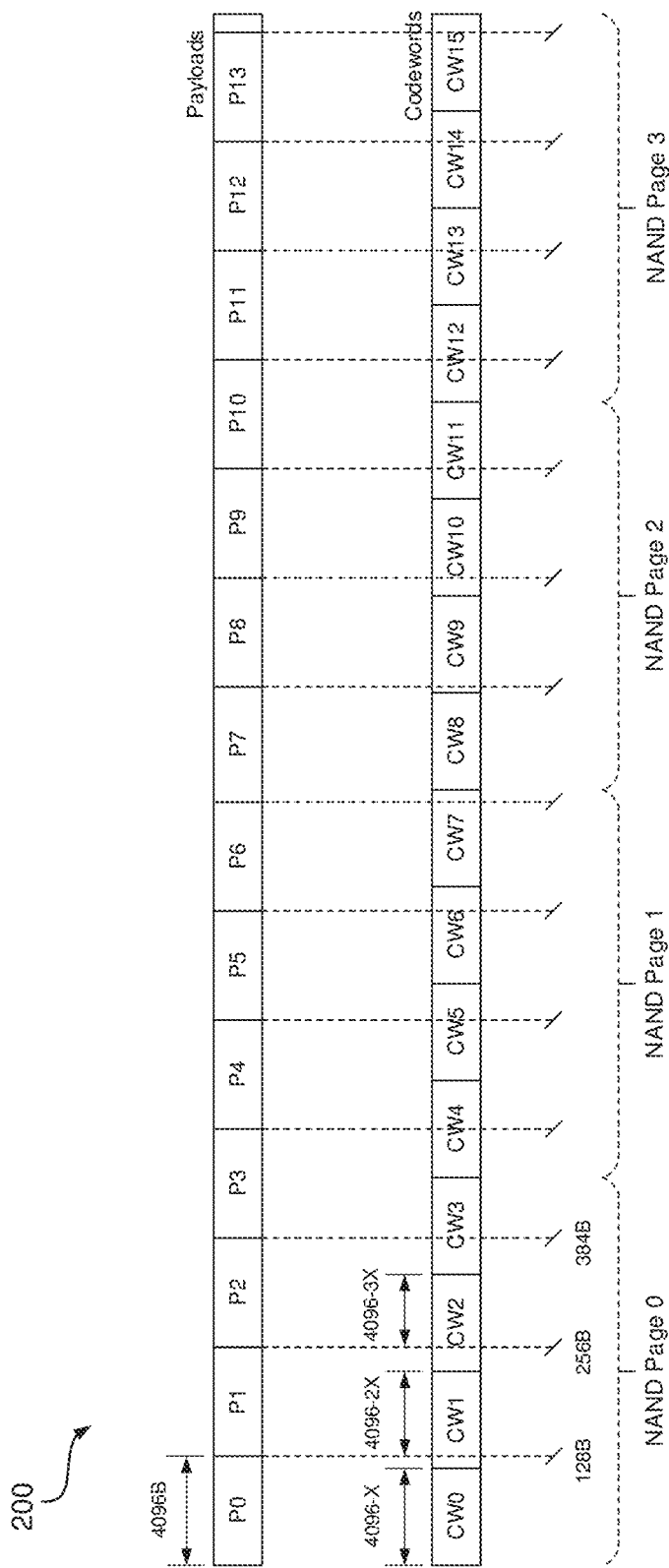
FIG. 2 illustrates the storage of data payloads in codewords of a nonvolatile semiconductor storage device, according to one or more embodiments of the present disclosure.

FIG. 2 illustrates data 200 stored in a NAND device, such as NAND devices 141-143 in FIG. 1. Data 200 may have been received from host 110 in a separate write process. FIG. 2 shows the data represented as plurality of payloads P0-P13 that are stored in a plurality of codewords CW0-CW15 in pages of a wordline in the NAND device. It should be noted that only the data storage portions of the codeword are shown in FIG. 2. Other peripheral bits for ECC, parity, metadata and headers are not shown in codewords CW0-CW15. However upon read out of the data, these peripheral bits will be employed to perform error correction, RAID reconstruction, and other activities necessary to reconstruct the payload sections from the codewords in the codeword offset module 164, whereupon the assembly module 168 reconstructs the complete payloads from the payload sections. The ECC bits in codewords CW0-CW15 are not shown. Codewords CW0-CW15 are stored on four NAND pages, NAND Page 0 to NAND Page 3, where each NAND page comprises four codewords. For example in FIG. 2, NAND Page 0 comprises codewords CW0-CW3, NAND Page 1 comprises codewords CW4-CW7, NAND Page 2 comprises codewords CW8-CW11, and NAND Page 3 comprises codewords CW12-CW15.

Typically a NAND page is approximately 16 KB in size, and each payload is 4,096 bytes (about 4 KB) in size. If the BER of the NAND device is low, the ECC in each codeword could fit into the spare area of the page, and so an integer number of payloads would fit into a corresponding codeword. However if the BER of the NAND device is high, the ECC in each codeword increases in size to the extent where the ECC bits in the codeword encroaches upon the space available for the storage of payload data. This means that the ECC bits take away some physical NAND space from the payload area thereby resulting in a smaller space available for the data to be stored. Effectively this means that the data size per codeword of the NAND device decreases. This can be seen in FIG. 2 where each of codewords CW0-CW15 have a smaller data size than the payloads P0-P13. In such a situation it would not be possible to fit an integer number of payloads into the page as the data for each page effectively spills over to at least the next adjacent codeword. The number of codewords from the start of the wordline is termed the codeword offset and the portion of a payload stored in the next adjacent codeword is termed the spill offset.

For example, in FIG. 2, the payloads P0-P13 each have a size of 4096 bytes, and codewords CW0-CW15 each have a size of 4096−X bytes, where X is the number of bytes of ECC within each codeword. For example, payload P0 is stored in two codewords CW0-CW1, where the data in payload P0 is stored in all of codeword CW0 and a small portion of codeword CW1. Here the codeword offset for payload P0 is "0", and the spill offset is 0 bytes as the payload begins at the beginning of the codeword. Data for payload P1 is stored beginning in codeword CW1, so its codeword offset is "1", but the start of the data is offset X bytes from the start of codeword CW1 (since this is occupied by the tail X bytes from payload P0), therefore its spill offset is X bytes. As another example, payload P7 in FIG. 2 is stored in three codewords CW7-CW9, where the data in payload P7 is stored in a portion of codeword CW7, all of codeword CW8, and a portion of codeword CW9. Here the codeword offset for payload P7 is codeword "7", and the payload then spills to codewords CW8 and CW9. The spill offset for P7 is 7×X bytes. The spill offset for successive payloads increases by X bytes for each payload, until the point is reached where the start of the payload once again coincides with the start of the codeword, if the number X is chosen to divide the codeword (payload data+ECC data) size by an integer multiple. If not, there will be some remainder less than X which may be left unoccupied by data, such that the next payload does coincide with the start of the codeword.

The amount of data from a payload that spills into the next adjacent codeword is dependent on the code rate of the wordline in the NAND device. In some implementations, it may be dependent on the coderate of each individual page in the wordline. As an example, a typical wordline comprises 16 NAND pages, each page having four codewords, and so the wordline spans 64 codewords. For NAND devices having low BER (e.g. for new memories), a payload would be able to fit within a codeword with the ECC bits in the spare area of the NAND page, i.e. a 1:1 mapping of payload to codeword, thus resulting in a code rate of 64/64 where 64 payloads fit into 64 codewords. However over time as the memory gets used, the BER increases necessitating an increased number of ECC bits in each codeword. This means less space for data to be stored in each codeword, causing the code rate to decrease. Exemplary reduced code rates are 63/64 where 63 payloads fit into 64 codewords, 62/64 where 62 payloads fit into 64 codewords, 60/64 where 60 payloads fit into 64 codewords, etc. This means the 1:1 mapping of payload to codeword now changes such that fewer payloads can fit into the codewords in a NAND page.

It should be noted that the underlying number of codewords is fixed in each NAND device, for example 64 in the aforementioned examples, however depending on the amount of ECC needed, it reduces the capability of the NAND device to store an equivalent number of payloads. Thus as the code rate decreases, a portion of each payload spills over to the next adjacent codeword. As an example, in FIG. 2, a main portion of payload P0 comprising 4,096 bytes-128 bytes has a codeword offset of "0", and a remaining portion of payload P0 comprising 128 bytes that is spilled over and stored in the next adjacent codeword CW1.

As a further example, in FIG. 2, a main portion of payload P1 comprising 4,096 bytes—2×128 bytes has a codeword offset of "1", and a remaining portion of payload P1 comprising 2×128 bytes is spilled over and stored in the next adjacent codeword CW2. In FIG. 2, it can be seen that the amount of data that is spilled over to the next adjacent codeword increases down the wordline as the codeword offset increases. In some instances, the payload may be spread over 3 adjacent codewords, with N bytes (say) in the first codeword, (4,096−128) bytes in the second codeword and (128−N) bytes in the third codeword.

The codeword offset and the spill offset are managed by the firmware 172 and the controller 130 such that when the SSD 120 receives a read request for data from a particular payload, the controller manages the read request and fetches a main portion and a remaining portion(s) of the requested payload from the appropriate codeword. FIG. 3A illustrates data 300 stored in a NAND device. In FIG. 3A the payloads that have been overlaid on the codewords of a wordline. As described in the foregoing, the codeword offset is a measure of the number of codewords from the start of the wordline, and indicates the codeword at which a payload begins. For example, the codeword offset x indicates that a payload, such as payload P(A), begins in codeword CW(x), the codeword offset measured from codeword zero along the wordline. As code rates in the NAND device decrease, the ratio of the number of payloads that can fit into the number of codewords along a wordline is less than 1:1. To cater to this mismatch, there exists a spill offset for each codeword. For codeword CW(x), the spill offset is a point within the codeword CW(x) at which the payload begins, as depicted in FIG. 3A. The spill offset is measured in bytes. It therefore follows that each codeword has an associated spill offset, and the size of the spill offset is dependent on the code rate.

When a payload is stored in the NAND device, the data contained in the payload is fit into a plurality adjacent codewords. The apportionment of a payload across the plurality of adjacent codewords is within the scope of the present disclosure. It should be noted that the 'adjacent' nature of the codeword refers to the logical address of the codeword. Thus two codewords are deemed to be adjacent if their logical addresses are in sequential order, i.e. one after another, even though the codewords may be located on different pages, blocks, planes and/or dies of the NAND device. For example in FIG. 3A, payload P(A) spans codeword CW(x) and codeword CW(x+1), where codeword CW(x+1) is the next adjacent codeword to codeword CW(x). Note that codewords CW(x) and CW(x+1) may be on the same wordline, or they may be on different wordlines, pages, blocks, planes and/or dies of the NAND device, however the logical addresses for codeword CW(x) and CW(x+1) are sequential. As shown in FIG. 3A, a main portion of payload P(A) is stored in codeword CW(x) and a remaining portion of payload P(A) is stored in the next adjacent codeword CW(x+1). Here the data in the main portion of payload P(A) is stored in codeword CW(x), from the spill offset of codeword CW(x) to the end of codeword CW(x), and the data in the remaining portion of P(A) is stored in the next adjacent codeword CW(x+1), from the start of codeword CW(x+1) to the spill offset of codeword CW(x+1). Similarly, the data in the main portion of payload P(B) in FIG. 3A is stored in codeword CW(y−1), from the spill offset of codeword CW(y−1) to the end of codeword CW(y−1), and the data in the remaining portion of P(B) is stored in the next adjacent codeword CW(y), from the start of codeword CW(y) to the spill offset of codeword CW(y).

As seen in FIG. 3A, the remaining portion of a payload spills to the next adjacent payload. Thus, when the firmware processes a read request from the host, once the main portion of a payload is located in a particular codeword in the NAND device, the remaining portion of that payload will be in the next adjacent codeword. As mentioned in the foregoing, the 'adjacent' nature of the codeword refers to the logical address of the codeword. Thus two codewords are deemed to be adjacent if their logical addresses are in sequential order along a wordline, i.e. one after another. In the case of the last codeword in a wordline, the next adjacent codeword may be at the start of the next wordline which may be in the same physical block, or in a different physical block, plane and/or die of the NAND device.

Referring to FIG. 3A, the very last codeword for the wordline is codeword CW(y). According to an embodiment of the present disclosure, the remaining portions of payloads continue to spill to the next adjacent codeword until the end of the wordline. Thus the portion of codeword CW(y), from the spill offset of codeword CW(y) to the end of codeword CW(y) remains unused. The next payload following payload P(B) is stored in codewords on the next wordline. For example if the wordline in FIG. 3A is wordline seven in the NAND device, when the codewords on wordline seven are all filled with data, the firmware increments to wordline eight and starts storing data in the codewords of wordline eight. There are several reasons for this, one of which is that each wordline has a unique parity code, and thus it simplifies generating an overall parity in the firmware for data stored in codewords on the same wordline (i.e. no payloads spill from a codeword on one wordline to a codeword on the next). Another reason for this is the BER may differ from one wordline to another, and thus the code rate may not be the same for each wordline. In this manner the present disclosure minimizes the wastage of space in the NAND device as the codewords on each wordline are filed sequentially until the very last codeword. Only the portion of the very last codeword on the wordline is not used. This is a considerable reduction in unused space compared to moving to a new codeword after each payload. Thus the unused space according to embodiments of the present disclosure is per wordline and not per payload/codeword, which is a marked reduction.

As the present disclosure is reliant on the sequence of logical addresses of the codewords, i.e. the logical address of codeword CW(x) and the next logical address of codeword CW(x+1), the spill offset for each codeword follows in the order in which the payloads were stored in the NAND devices. Thus if data has been written from a lower NAND page, to the middle NAND page, to the upper NAND page, the spill offset within each page will follow suit in the same sequence. This allows for better usage of the NAND device my minimizing wastage of space within a page.

FIG. 3B illustrates the distribution of payload data 320 in codewords CW2-CW4 of the NAND device as shown in FIG. 2. Codewords CW2-CW4 are logically adjacent to each other in the sense that their logical cluster addresses are sequential. During a write process, payloads P1-P4 are distributed in codewords CW2-CW4 in the NAND device. When the code rate in the NAND device is less than 1:1, each codeword has an associated spill offset where a new payload begins. For example, a remaining portion of payload P1 is stored in codeword CW2, from the start of codeword CW2 to the spill offset of codeword CW2. While not shown in FIG. 3B, the main portion of payload P1 is stored in codeword CW1, from the spill offset of codeword CW1 to the end of codeword CW1. Similarly, payload P2 has a main portion that is stored in codeword CW2, from the spill offset in codeword CW2 to the end of codeword CW2. The remaining portion of payload P2 can no longer fit into codeword CW2, and so it spills over and is stored in the adjacent codeword CW3, from the start of codeword CW3 to the spill offset of codeword CW3. Further, payload P3 has a main portion that is stored in codeword CW3, from the spill offset in codeword CW3 to the end of codeword CW3. The remaining portion of payload P3 can no longer fit into codeword CW3, and so it spills over and is stored in the adjacent codeword CW4, from the start of codeword CW4 to the spill offset of codeword CW4. For completeness, the rest of codeword CW4, from the spill offset in codeword CW4 to the end of codeword CW4, is filled with data from payload P4. As can be seen from FIG. 3B, the spill offset in each codeword becomes increasingly larger as the codeword offset increases.

When the data from payloads P1-P4 is stored in codewords CW2-CW4 of the NAND device according to the write sequence as described in relation to FIG. 3B, the controller 130 is able to quickly locate the data from any of the payloads when processing a read request from the host 110. The controller 130 retrieves the requested data with knowledge of the physical (MCA) address of the codewords CW2-CW4 and the associated spill offset. When the controller 130 receives a read request for data from a payload, the controller obtains the LCA associated with the requested data from the read request, and determines the associated MCA, codeword offset and spill offset. Such determination may be done using a plurality of look-up tables, as will be detailed in the following description.

For example, when the controller 130 receives a request for data from payload P3, the controller uses the LCA contained in the read request to obtain the MCA and codeword offset 3 and the associated spill offset for codeword CW3. The controller 130 then retrieves the main portion of payload P3 from codeword CW3, from the spill offset of codeword CW3 to the end of codeword CW3. The controller then determines if there is a remaining portion of payload P3 to be read, which there is. The controller 130 then obtains the spill offset of the next adjacent codeword CW4 and reads spilled data in codeword CW4 up to the spill offset of codeword CW4. The controller then assembles the requested data from the main portion and the remaining portion of payload P3, appends a header, metadata, parity bits and ECC bits to the data, and transfers the assembled data to the host 110.

FIG. 3C shows the distribution of payload data 340 in codewords CW7-CW9 of the NAND device in further detail. Due to the code rate of the NAND device, the cumulative incremental increase in the spill offset as the codeword offset increases has resulted in the payload P7 spanning three codewords CW7-CW9. Here payload P7 has a main portion that is stored in codeword CW7, from the spill offset in codeword CW7 to the end of codeword CW7. The remaining portion of payload P7 can no longer fit into codeword CW7, and so it spills over. However the remaining portion of payload P7 is larger than the codeword size of the next adjacent codeword CW8, and so the remaining portion of payload P7 is stored in the entire codeword CW8, and the next adjacent codeword CW9, from the start of codeword CW9 to the spill offset of codeword CW9.

When the controller 130 receives a request for data from payload P7, the controller uses the LCA contained in the read request to obtain the MCA and the associated codeword offset "7" and spill offset. The controller 130 then retrieves the main portion of payload P7 from codeword CW7, from the spill offset of codeword CW7 to the end of codeword CW7. The controller then determines if there is a remaining portion of payload P7 to be read, which there is. The controller 130 then obtains the spill offset of the next adjacent codeword CW8 and reads spilled data in codeword CW8 up to the spill offset. In the case of codeword CW8, the spill offset is the size of the codeword. The controller then repeats itself and determines if there is a remaining portion of payload P7 to be read, which there is from codeword CW9. The controller 130 then obtains the spill offset of the next adjacent codeword CW9 and reads spilled data in codeword CW9 up to the spill offset of codeword CW9. The controller then assembles the requested data from the main portion of payload P7 in codeword CW7, and the remaining portion of payload P7 from codewords CW8 and CW9, and transfers the assembled data to the host 110.

When the SSD 120 boots up, the controller 130 and firmware 172 may perform several calculations to determine the spill offset for each codeword. Parameters such as the payload size PL and the code rate CR are stored in the configuration file 167 which is read by the firmware 172 on boot up. The firmware 172 then determines the codeword size CW_Size and the spill per codeword Spill_per_CW by:

$$CW\_Size = PL \times CR = PL \times (\text{No. of Payloads} \div \text{No. of Codewords}) \quad (1)$$

$$Spill\_per\_CW = PL - CW\_Size \quad (2)$$

For example, for a code rate of 62/64 and a payload size of approximately 4 kB (specifically 4,096 bytes), the codeword size is 3,968 bytes and the spill offset per codeword is 128 bytes. As another example, a code rate of 60/64 and a payload of 4 kB would result in a codeword size of 3,840 bytes and a spill offset per codeword of 256 bytes.

In order to read a payload from multiple codewords in the NAND devices, the firmware 172 determines the portion (e.g. the main portion or the remaining portion) of the payload on each codeword. In order to do so, the firmware 172 determines the size of the payload on each codeword and the spill offset within the codeword from where to read the payload data. Here the firmware 172 calculates the total accumulated spill Total_Spill at a codeword offset CW_Offset, and the spill offset Spill_Offset by:

$$Total\_Spill = CW\_Offset \times Spill\_per\_CW \quad (3)$$

$$Spill\_Offset = Total\_Spill \% CW\_Size \quad (4)$$

where % is a modulo operator which returns the remainder of a division, i.e. the spill offset is the remainder from the division of the total accumulated spill by the codeword size.

As an example, assuming a code rate of 62/64, if a read request contains LCA information that points to the payload P10 stored in codeword CW11, using equation (1) the codeword size is 4,096×62/64=3,840 bytes, using equation (2) the spill per codeword is 4,096−3,840=128 bytes, using equation (3) the total spill is 11×128=1,408 bytes, and using equation (4) the spill offset is 1,408% 3,840=1,408 bytes. Using similar calculations, the spill offset for the next adjacent codeword CW12 is 1,536 bytes. This means that the main portion of requested payload P10 is located at 1,408 bytes from the start of codeword CW11 to the end of codeword CW11, and the remaining portion of the payload P10 is located in the first 1,536 bytes of the next adjacent codeword CW12.

The firmware 172 performs calculations using equations (1) to (4) repeatedly for each codeword to determine the associated spill offset so that the correct read data requested by the host 110 can be retrieved from the NAND devices 140 by the controller 130. However such repeated calculations are compute intensive and will put a burden on the processors of the SSD 120. The present disclosure includes the implementation of a payload spill boundary look-up table 182 that is created by the firmware 172 when the SSD 120 first initializes and boots up. The payload spill boundary look-up table 182 comprises spill offset values for each codeword offset which has been calculated using equations (1) to (4) for a specific code rate. These values are stored in the SRAM 180 of the controller 130. An exemplary payload spill boundary look-up table 182 is shown in Table 1. As can be seen the spill offset values loop after a total spill that is equivalent to the size of the payload of 4,096 bytes, i.e. the spill offset values loop back to 128 bytes after 32 codewords. By indexing into the payload spill boundary look-up table 182, the controller is able to process a read request from the host 110 quickly.

As previously mentioned, the code rate may not be the same across all the wordlines in the NAND devices 140. The reliability and the BER of each wordline in a NAND memory may differ from one page to another. Some wordlines may require more error correction compared to others. Such wordlines may be able to fit fewer data payloads than wordlines requiring less error correction. For example, memories where less than 10% of the wordlines exhibit high BER while the remaining 90% of the wordlines are healthy enough for a 1:1 mapping, the firmware will end up setting all wordlines as a short data frame to cater to the high ECC required by the wordlines exhibiting high BER. In such a situation, the loss of performance is dictated by the wordlines with the highest BER. Thus according to some embodiments of the present disclosure the firmware 172 may create a payload spill boundary look-up table 182 for each code rate in the NAND devices 140 thus giving rise to a plurality of payload spill boundary look-up tables 182 which are stored in the SRAM 180. In further embodiments of the present disclosure, the controller 130 may measure the code rate of each of the wordlines in the NAND devices 140 on boot up of the SSD 120 and write the measured code rates to the configuration file 167 for the creation of the payload spill boundary look-up tables 182.

Figure 7:
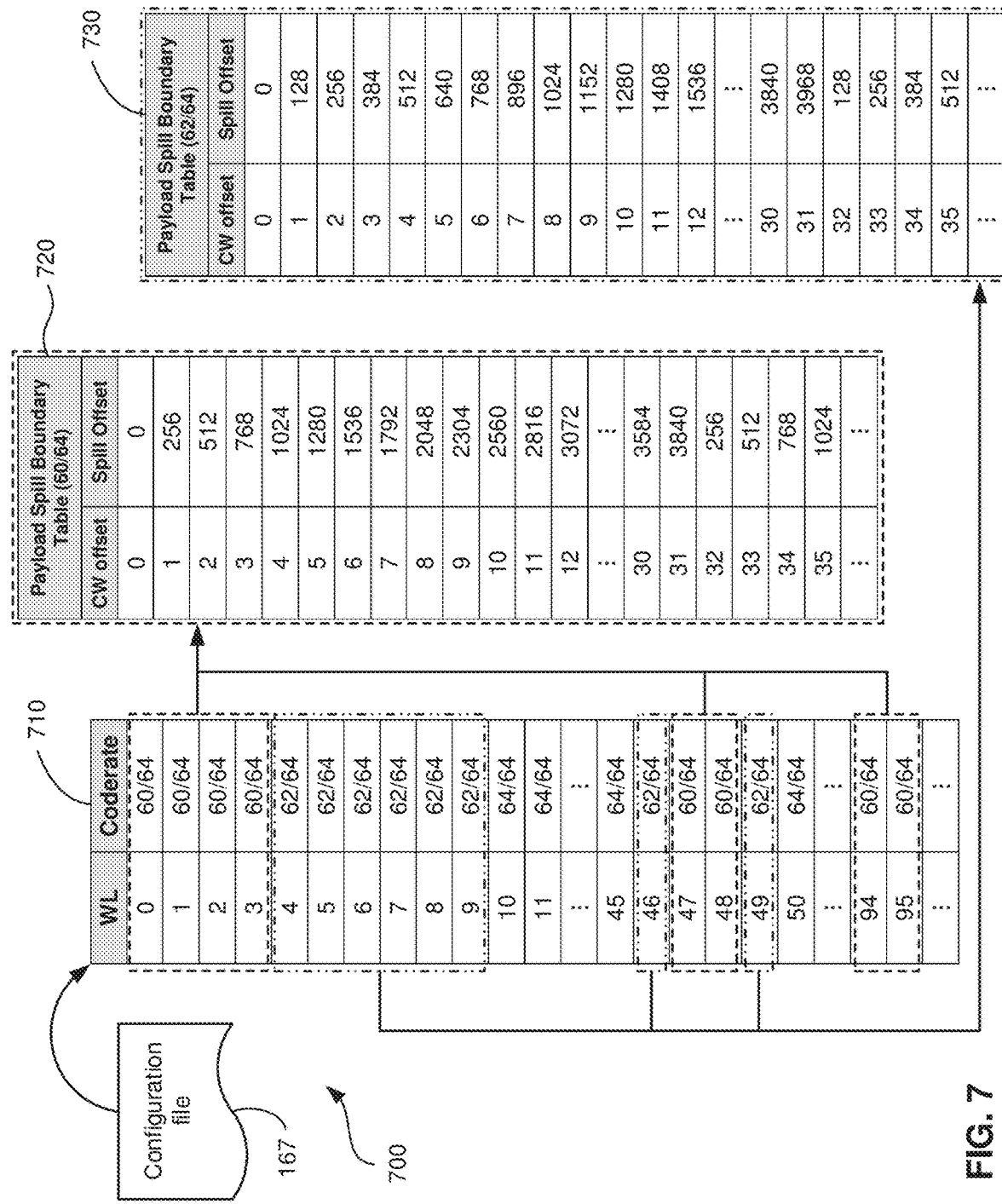
FIG. 7 illustrates an example of a wordline to coderate mapping table, according to one or more embodiments of the present disclosure.

FIG. 7 illustrates the composition 700 of the configuration file 167 as shown in FIG. 1, according to an embodiment of the present disclosure. The configuration file 167 may contain a wordline-to-coderate mapping table 710. During read and write operations, the CW Offset Module 164 indexes the wordline-to-coderate mapping table 710 and obtains a pointer to a payload spill boundary table 720, 730 appropriate for the coderate associated with the wordline. For example, in table 710, wordlines 0-3, 47, 48, 94 and 95 refer to a coderate 60/64. and the entries in table 710 that correspond to those wordlines contain a pointer to Payload Spill Boundary Table (60/64) 720. As another example, in table 710, wordlines 4-9, 46 and 49 refer to a coderate 62/64, and the entries in table 710 that correspond to those wordlines contain a pointer to Payload Spill Boundary Table (62/64) 730. The present disclosure therefore provides a common, flexible and customizable infrastructure that allows for changes in the code rate of the NAND devices 140 to be easily implemented during initialization of the SSD 120 without having to reprogram the firmware 172.

TABLE 1

Exemplary Payload Spill Boundary Look-Up Table
Payload Spill Boundary Table (62/64)

| Codeword Offset | Spill Offset |
| --- | --- |
| 0 | 0 |
| 1 | 128 |
| 2 | 256 |
| 3 | 384 |
| 4 | 512 |
| 5 | 640 |
| 6 | 768 |
| 7 | 896 |
| 8 | 1024 |
| 9 | 1152 |
| 10 | 1280 |
| 11 | 1408 |
| 12 | 1536 |
| . | . |
| . | . |
| . | . |
| 30 | 3840 |
| 31 | 3968 |
| 32 | 128 |
| 33 | 256 |
| 34 | 384 |
| 35 | 512 |
| . | . |
| . | . |
| . | . |

Figure 4:
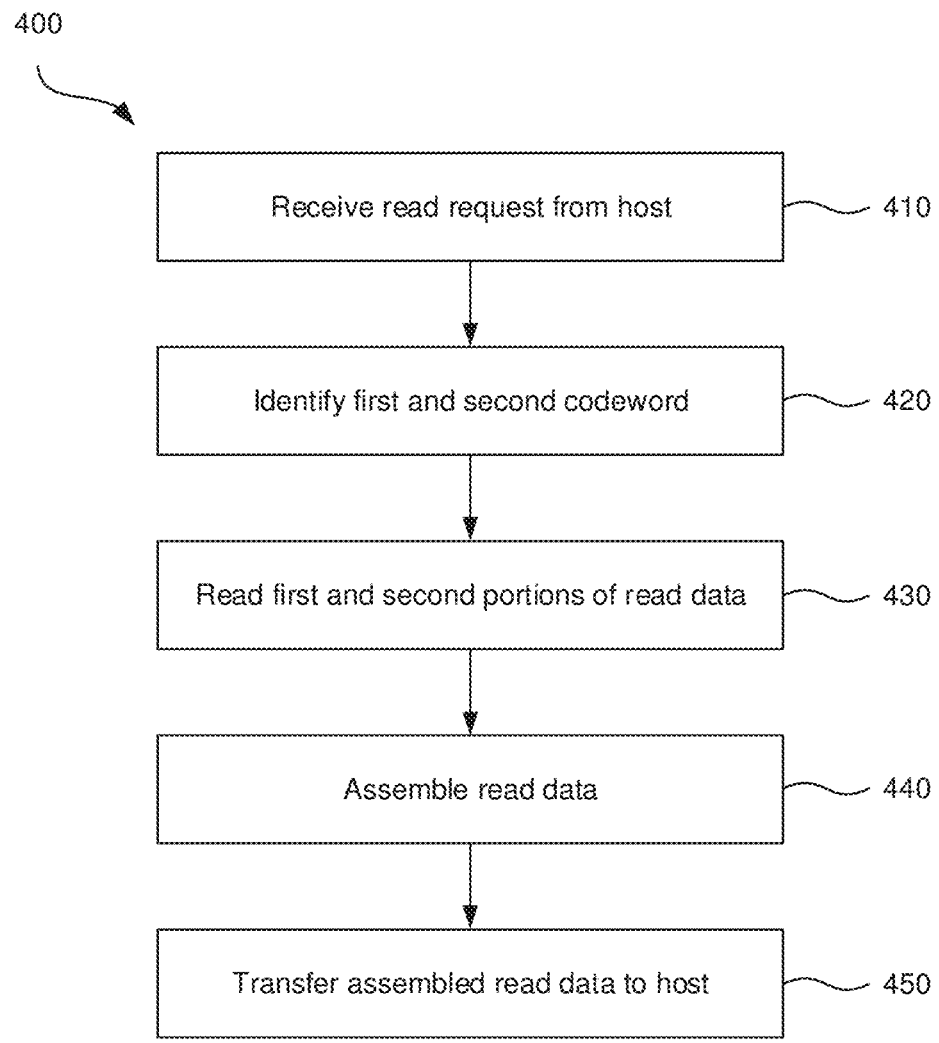
FIG. 4 is a flow diagram of a first method for processing a read request from a host according to one or more embodiments of the present disclosure.

FIG. 4 illustrates an exemplary flow diagram of a method 400 for processing a read request from the host 110 according to an embodiment of the present disclosure. The method begins at step 410 where controller 130 receives a read request from the host 110 via the host interface 132. The read request contains the LCA of the read data and the payload size PL. In some embodiments the controller 130 may use the LCA in the read request to index into a logical-to-physical (L2P) look-up table 162 stored in the flash translation layer 160 to obtain the MCA of the NAND device 140 in which the read data is stored. The L2P look-up table 162 may also identify the NAND channel 144-146 through which the data can be accessed.

In step 420, the controller 130 uses the MCA of the read data to obtain a codeword offset CW_Offset from a codeword offset module 164 where the MCA is used to index into a look-up table 166 that maps each MCA in the NAND devices 140 to the codeword offset along the respective wordline in the NAND devices. As discussed in the foregoing, the codeword offset is a measure of the number of codewords from the start of a wordline at which the codeword containing the read data begins. Once the codeword offset for the payload is obtained, codeword offset x, for example, the controller may calculate the spill offset Spill_Offset for codeword CW(x) at codeword offset x using equations (1) to (4). In some embodiments, the firmware 172 uses the codeword offset x to index into a payload spill boundary look-up table 182 (such as the look-up table in Table 1) stored in the SRAM 180 of the controller 130 to obtain the spill offset in codeword CW(x). The controller 130 also obtains the spill offset of the next adjacent codeword CW(x+1).

In step 430, the controller uses the codeword offset x and the associated spill offset to read a main portion of the payload from the codeword CW(x). Here the main portion of the payload is read from the spill offset of the codeword CW(x) to the end of the codeword CW(x). The controller then uses the codeword offset x+1 and the associated spill offset to read a remaining portion of the payload from the next adjacent codeword CW(x+1), from the start of the next adjacent codeword CW(x+1) to the spill offset of the next adjacent codeword CW(x+1).

In step 440, the assembly module 168 of the flash translation layer 160 of the controller 130 assembles the read data from the payload as read from the NAND devices 140. The payload comprises the main portion from codeword CW(x) and the remaining portion from the next adjacent codeword CW(x+1), similar to the scenario for payload P3 as depicted in FIG. 3B. The assembly module 168 also appends to the read data a header, metadata, ECC bits and parity bits. In step 450, the controller transfers the assembled read data to the host 110.

Figure 5:
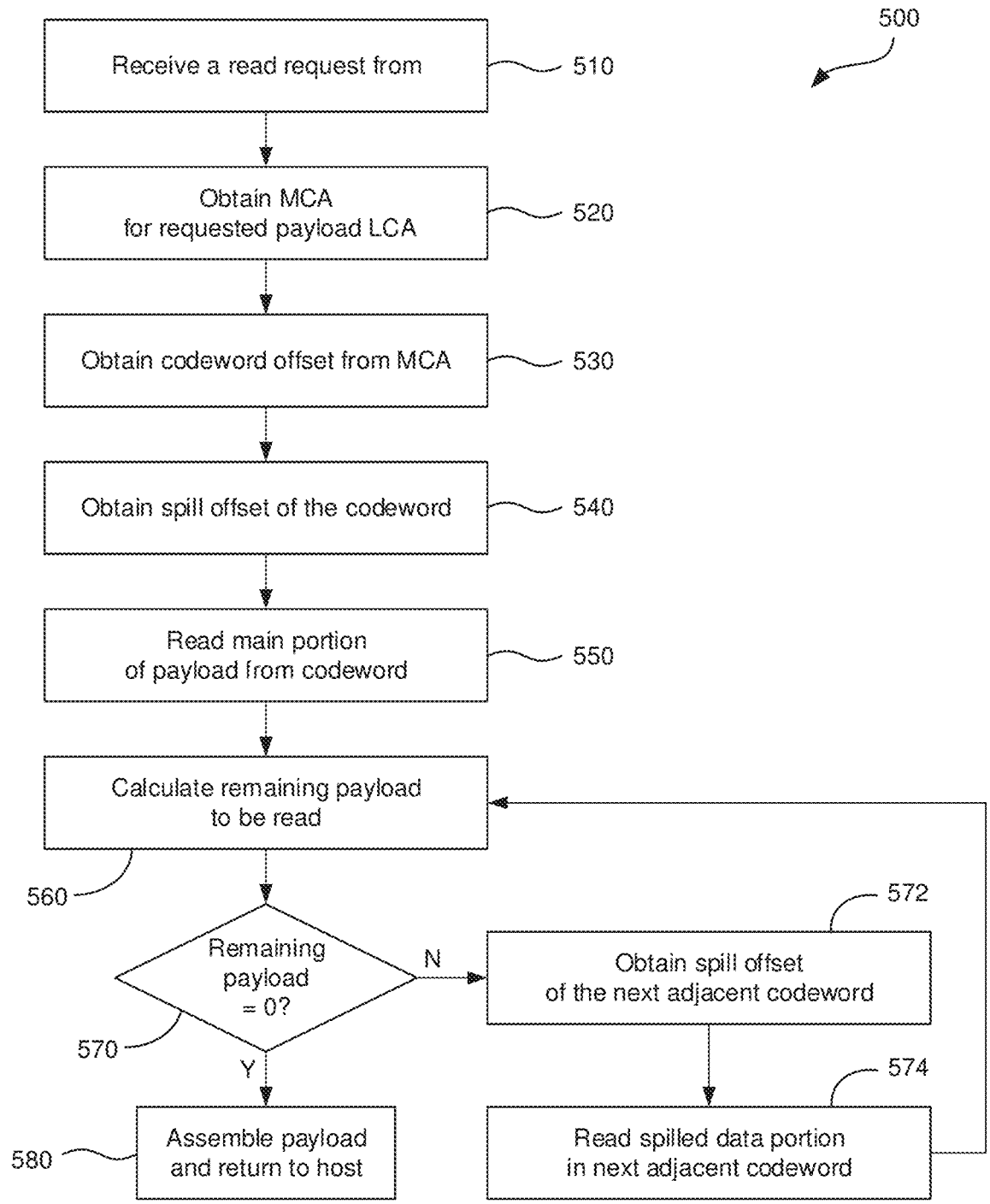
FIG. 5 is a flow diagram of a second method for processing a read request from a host according to one or more embodiments of the present disclosure.

FIG. 5 illustrates an exemplary flow diagram of a method 500 for processing a read request from the host 110 according to another embodiment of the present disclosure. The method begins at step 510 where controller 130 receives a read request from the host 110 via the host interface 132. The read request comprises the LCA of the read data and the payload size PL. In some embodiments the controller 130 may use the LCA in the read request to index into a logical-to-physical (L2P) look-up table 162 stored in the flash translation layer 160 to obtain the MCA of the NAND device 140 in which the read data is stored (step 520). The L2P look-up table 162 may also identify the NAND channel 144-146 through which the data can be accessed.

In step 530, the controller 130 uses the MCA of the read data to obtain a codeword offset CW_Offset from a codeword offset module 164 where the MCA is used to index into a look-up table 166 that maps each MCA in the NAND devices 140 to the codeword offset along the respective wordline in the NAND devices. As discussed in the foregoing, the codeword offset is a measure of the number of codewords from the start of a wordline at which the codeword containing the read data begins. Once the codeword offset for the payload is obtained, codeword offset x, for example, the method then proceeds to step 540 where the controller calculates the spill offset Spill_Offset for codeword CW(x) at codeword offset x using equations (1) to (4). In some embodiments, the firmware 172 uses the codeword offset x to index into a payload spill boundary look-up table 182 (such as the look-up table in Table 1) stored in the SRAM 180 of the controller 130 to obtain the spill offset in codeword CW(x). The controller 130 also obtains the spill offset of the next adjacent codeword CW(x+1).

In step 550, the controller uses the codeword offset x and the associated spill offset to read a main portion of the payload from the codeword CW(x). Here the main portion of the payload is read from the spill offset of the codeword CW(x) to the end of the codeword CW(x). The controller then calculates a remaining portion of the payload that needs to be read from the NAND devices (step 560) by subtracting the main portion from the payload size PL, and determines if the remaining portion is zero (step 570). In step 570 the controller is effectively determining if the entire payload is contained in the codeword CW(x) or if some of the payload data has spilled into the next codeword CW(x+1). If there is no remaining portion of the payload to be read (i.e. 'Y' at step 570), the assembly module 168 of the flash translation layer 160 of the controller 130 assembles the read data from the payload as read from the NAND devices 140 (step 580). Here the assembly module 168 also appends to the read data a header, metadata, ECC bits and parity bits, and the controller transfers the assembled read data to the host 110.

If there is a remaining portion of the payload to be read (i.e. 'N' at step 570), the controller obtains a spill offset of the next adjacent codeword CW(x+1) in step 572. This may be done by calculation using equations (1) to (4), or by indexing into the payload spill boundary look-up table 182 with the codeword offset x+1. In step 574 the controller reads the portion of the payload that has spilled into the next adjacent codeword CW(x+1). The controller then loops back to step 570 where it determines if there is a portion of the payload data that has yet to be read, and if so (i.e. 'N' at step 570), it repeats step 572 and step 574 until all of the payload data has been read (i.e. 'Y' at step 570). The controller then assembles the main portion and the remaining portion(s) of the payload and returns the read data to the host 110.

As an example, if a host requests data from payload P3 as shown in FIG. 3B, in step 550 of method 500, the controller reads the main portion of P3 from the spill offset of codeword CW3 to the end of codeword CW3. The controller 130 then determines if there is a remaining portion of the payload P3 in step 560, which there is (i.e. 'N' in step 570). The controller 130 then obtains the spill offset of the next adjacent codeword CW4 (step 572) and reads the spilled data portion in codeword CW4 from the start of codeword CW4 to the spill offset of codeword CW4 (in step 574). The spilled data portion in codeword CW4 is the remaining portion of payload P3. The method 500 loops back to step 560 where the controller 130 calculates a remaining payload to be read. For the portion of P3 in next adjacent codeword CW4, there is no remaining payload to be read (i.e. 'Y' in step 570), and so the assembly module of the controller 130 then assembles the read data from the main portion and remaining portion of payload P3 in step 580. The assembly module also appends a header, metadata, ECC bits and parity bits to the payload P3, after which the read data is returned to the host.

As another example, if a host requests data from payload P7 as shown in FIG. 3C, in step 550 of method 500, the controller reads the main portion of P7 from the spill offset of codeword CW7 to the end of codeword CW7. The controller 130 then determines if there is a remaining portion of the payload P7 in step 560, which there is (i.e. 'N' in step 570). The controller 130 then obtains the spill offset of the next adjacent codeword CW8 (step 572) and reads the spilled data portion in codeword CW8 from the start of codeword CW8 to the spill offset of codeword CW8 (in step 574). It should be noted that the spill offset of codeword CW8 spans the size of the codeword. This is due to the cumulative and cyclic nature of the spill offset as exemplified in Table 1, where the spill offsets cumulatively increase until they reach the size of the codeword after which they loop back and start accumulating again. The method 500 then loops back to step 560 where the controller 130 calculates a remaining payload to be read. For the portion of P7 in codeword CW8, there is a further remaining payload to be read (i.e. 'N' in step 570). The controller 130 obtains the spill offset of the next adjacent codeword CW9 (step 572) and reads the spilled data portion in codeword CW9 from the start of codeword CW9 to the spill offset of codeword CW9 (in step 574). Once again the method 500 then loops back to step 560 where the controller 130 calculates a remaining payload to be read. For the portion of P7 in codeword CW9, there is no remaining payload to be read (i.e. 'Y' in step 570). The spilled data portions in codewords CW8 and CW9 form the remaining portion of payload P7. The assembly module of the controller 130 then assembles the read data from the main portion and remaining portion of payload P7 in step 580. The assembly module also appends a header, metadata, ECC bits and parity bits to the payload P7, after which the read data is returned to the host.

Figure 6:
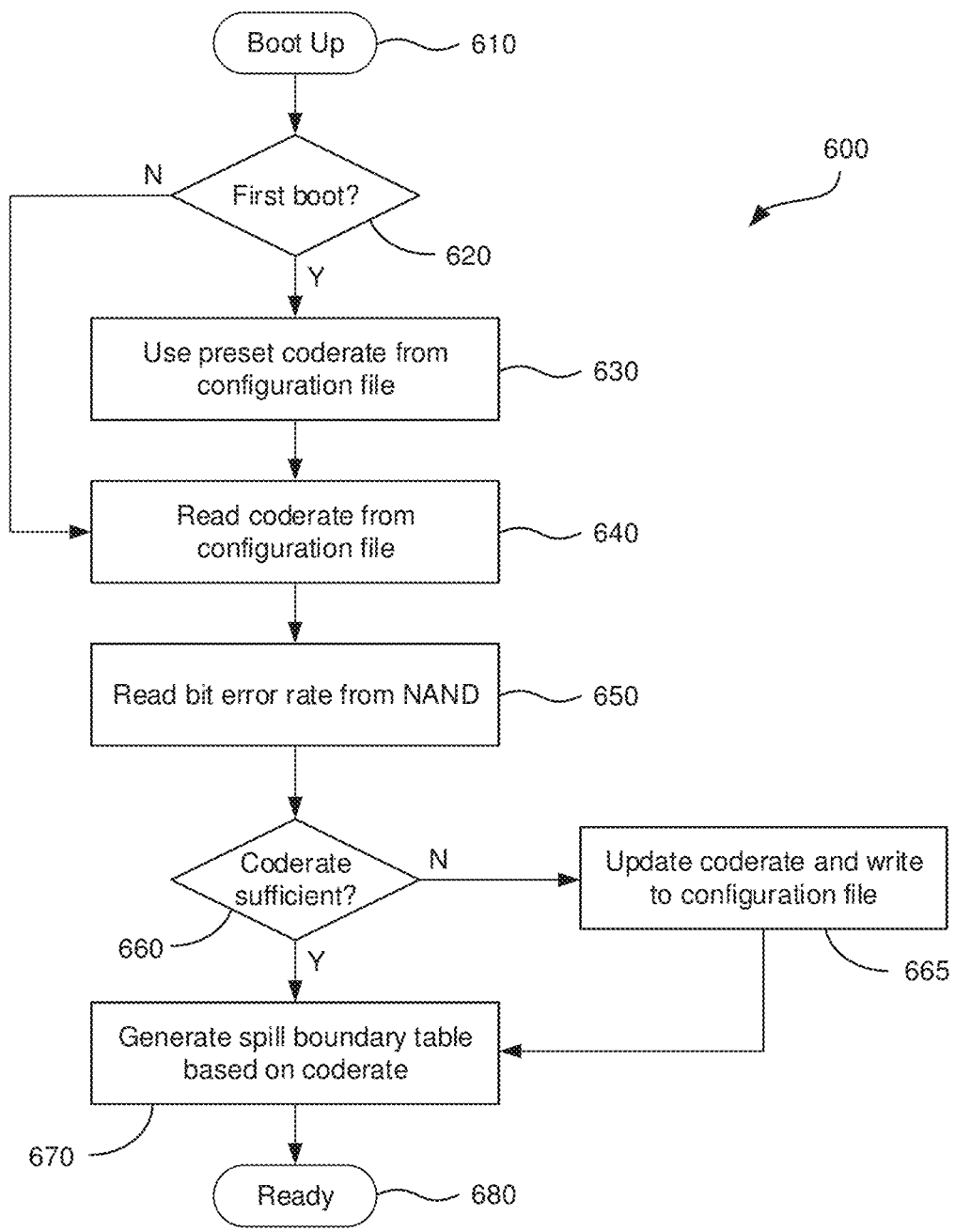
FIG. 6 is a flow diagram of method for generating a spill boundary table when processing a read request from a host, according to one or more embodiments of the present disclosure.

As mentioned in the foregoing, the firmware 172 may access the configuration file 167 stored in the controller to determine the code rate of the NAND devices 140 prior to performing any calculations (such as those described in equations (1) to (4)). The code rate is also used to generate the payload spill boundary look-up table 182 stored in the SRAM 180 of the controller 130. The controller may additionally measure the code rate of the NAND devices 140 periodically and update the code rate stored in the configuration file 167. FIG. 6 illustrates an exemplary flow diagram of a method 600 for using the code rate in generating the payload spill boundary look-up table 182.

The method 600 begins at step 610 when the SSD 120 boots up. The controller 130 detects the boot up of the SSD 120 and determines if it is the first time the SSD 120 is booting up since being manufactured (step 620). If it is the first time (i.e. 'Y' at step 620), the controller 130 uses a preset code rate in the configuration file 167. This preset code rate may be written to the configuration file 167 by the manufacturer during assembly of the SSD 120. However if it is not the first boot up since manufacture (i.e. 'N' at step 620), the controller uses the most recently stored code rate in the configuration file 167. The code rate is then read from the configuration file 167 (step 640).

In step 650 the controller 130 reads the BER of the NAND devices 140 and determines if the code rate is sufficient (step 660). As mentioned in the foregoing, the code rate indicates how much smaller each codeword needs to be compared to the payload so as to accommodate ECC bits in each codeword to cater to the BER of the NAND devices. If the controller 130 determines that the code rate is sufficient (i.e. 'Y' at step 660), the controller 130 generates the payload spill boundary look-up table 182 using equations (1) to (4) in step 670 for use during the operation of the SSD 120. If the controller 130 determines that the code rate is not sufficient for the BER of the NAND devices 140 (i.e. 'N' at step 660), the controller 130 updates the code rate in step 665, writes the new code rate value to the configuration file 167, and generates the payload spill boundary look-up table 182 on the fly using equations (1) to (4) in step 670 for use during the operation of the SSD 120.

Figure 8:
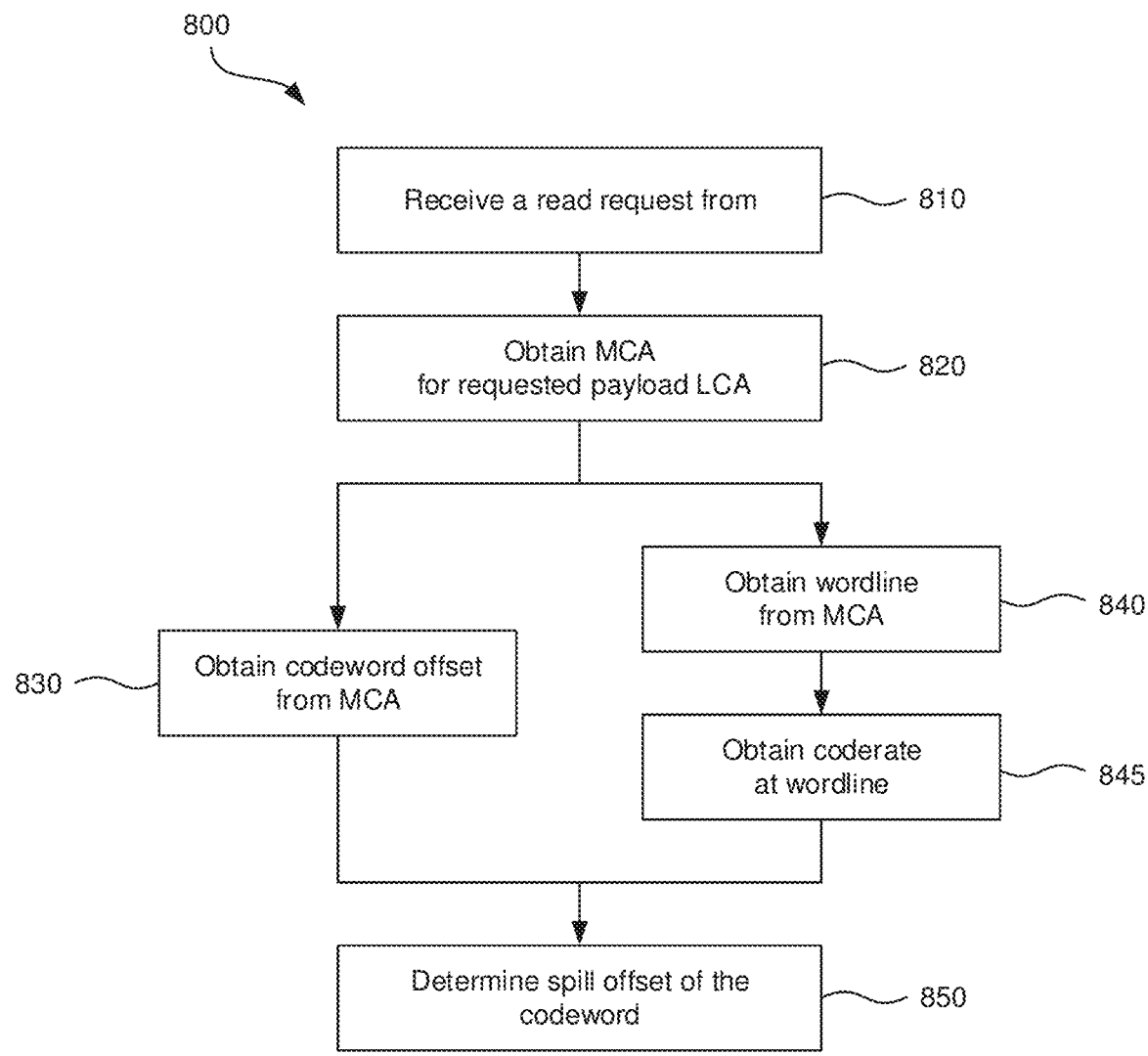
FIG. 8 is a flow diagram of a method for handling different coderates per wordline, according to one or more embodiments of the present disclosure.

FIG. 8 illustrates an exemplary flow diagram of a method 800 for determining the spill offset from a coderate specific payload spill boundary look-up table using a wordline-to-coderate table, such as the wordline-to-coderate table 710 shown in FIG. 7. The method 800 begins where the controller 130 receives a host read request containing a payload with an LCA (step 810). In some embodiments the controller 130 may use the LCA in the read request to index into a look-up table (LUT) 162 stored in the flash translation layer 160 to obtain the MCA of the NAND device 140 in which the read data is stored (step 820). In step 830, the controller 130 uses the MCA of the read data to obtain a codeword offset CW_Offset from a codeword offset module 164 where the MCA is used to index into a look-up table 166 that maps each MCA in the NAND devices 140 to the codeword offset in the NAND devices. The controller also uses the MCA of the read data to obtain the wordline (WL) along which the codewords storing the read data are located (step 840). In step 845, the wordline is used to index into a wordline-to-coderate mapping table (such as tables 710 and 720 in FIG. 7, for example) to obtain a pointer to the appropriate payload spill boundary look up table. In step 850, the payload spill boundary table is indexed using the codeword offset CW_Offset to obtain the Spill_Offset.

In the foregoing, all recitation of "module" or "layer" should be taken to mean a plurality of circuits within the controller that facilitates the function as described. Such circuits may comprise electronic components formed on a semiconductor chip, such as, for example, transistors and resistors. Further, all recitation of "codeword size" should be taken to mean the data length of a codeword, and such terms may be used interchangeably throughout the present disclosure. It should be noted that the term "about" or "approximately" indicates a range of ±20% of the stated value.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method performed by a controller of a solid state drive, the method comprising:
    receiving from a host a read request for read data stored in one or more of a plurality of nonvolatile semiconductor storage devices of the solid state drive;
    identifying a first codeword and a second codeword from a plurality of codewords stored in the one or more of the plurality of nonvolatile storage devices, the first codeword and the second codeword comprising the read data corresponding to the read request;
    retrieving a first code rate associated with the first codeword and a second code rate associated with the second codeword from a configuration file stored in the controller;
    indexing into a payload spill boundary look-up table which maps a codeword in the nonvolatile semiconductor storage devices to a spill offset based on the first code rate and/or the second code rate, the spill offset identifying a position within the first codeword at which the read data begins;
    responsive to the read request, reading a first portion of the read data contained in the first codeword using the first code rate and reading a second portion of the read data contained in the second codeword using the second code rate;
    assembling the first portion and the second portion as assembled read data; and
    transferring the assembled read data to the host responsive to the read request,
    wherein
        the second codeword is adjacent to the first codeword as stored in the one or more of the plurality of nonvolatile storage devices, and
        the assembled read data has a data length that is greater than a first data length of the first codeword or a second data length of the second codeword.

2. The method of claim 1, wherein the read data includes a logical cluster address (LCA).

3. The method of claim 2, further comprising:
    converting the LCA of the read data into a media cluster address (MCA) in the nonvolatile semiconductor storage devices at which the read data is stored.

4. The method of claim 3, further comprising:
    determining a codeword offset corresponding to the MCA, the codeword offset identifying the first codeword in the plurality of codewords in which the read data begins.

5. The method of claim 4, further comprising:
    identifying a spill offset associated with the first codeword offset.

6. The method of claim 5, further comprising:
    reading the first portion of the read data from the spill offset of the first codeword to the end of the first codeword.

7. The method of claim 6, further comprising:
    calculating the second portion of the read data to be read.

8. The method of claim 7, further comprising:
    responsive to the second portion of the read data being non-zero,
    identifying a spill offset of the second codeword, and
    reading the second portion of the read data from start of the second codeword to the spill offset of the second codeword.

9. The method of claim 8, further comprising:
    determining if the second portion of the read data has spilled over to a next adjacent codeword.

10. The method of claim 9, further comprising:
    responsive to the second portion of the read data spilling over to the next adjacent codeword,
    identifying a spill offset of the next adjacent codeword, and
    reading the spilled second portion of the read data from start of the next adjacent codeword to the spill offset of the next adjacent codeword.

11. The method of claim 3, further comprising:
    indexing into an address look-up table which maps the LCA to the MCA in the nonvolatile semiconductor storage device at which the read data is stored.

12. The method of claim 4, further comprising:
    indexing into a codeword look-up table which maps the MCA to the codeword offset for the nonvolatile semiconductor storage devices at which the read data is stored.

13. The method of claim 5, wherein the first data length and the second data length are equal, the method further comprising:
    determining a data spill per codeword by subtracting the first data length from a data length of the read data;
    determining a total spill in the nonvolatile semiconductor storage device for each codeword offset by multiplying the spill per codeword by the codeword offset; and
    determining the spill offset by dividing the total spill by the first data length.

14. The method of claim 5, wherein the plurality of codewords are stored on one or more wordlines in the nonvolatile semiconductor storage devices.

15. The method of claim 14, wherein each of the wordlines have a different code rate.

16. The method of claim 15, wherein the controller generates a payload spill boundary look-up table for each code rate.

17. The method of claim 16, wherein the read data extends over multiple wordlines, the method further comprising:
    determining the wordline associated with each codeword, and
    selecting a payload spill boundary look-up table based on the associated wordline.

18. The method of claim 1, further comprising:
    storing a code rate mapping table of the nonvolatile semiconductor storages device in the configuration file in a read-only memory within the controller, the code rate mapping table storing code rates associated with a plurality of wordlines in the nonvolatile storage devices.

19. The method of claim 18, further comprising:
  determining a bit error rate associated with each of the plurality of nonvolatile semiconductor storage devices;
  adjusting a code rate of at least one of the nonvolatile semiconductor storage devices based on the bit error rate; and
  updating the code rate in the configuration file.

20. The method of claim 1, wherein assembling the read data comprises combining the first and second portions of the read data with a header, error correction code (ECC) and parity check code prior to transferring the read data to the host.

21. The method of claim 1, wherein each of the plurality of the nonvolatile semiconductor storage devices comprises a NAND memory.

* * * * *